United States Patent [19]

Schleifstein

[11] Patent Number: 5,116,898
[45] Date of Patent: May 26, 1992

[54] FLAME RETARDANT POLYPROPYLENE BASED FORMULATIONS

[75] Inventor: Robert A. Schleifstein, Baton Rouge, La.

[73] Assignee: Ethyl Corporation, Richmond, Va.

[21] Appl. No.: 583,402

[22] Filed: Sep. 17, 1990

Related U.S. Application Data

[63] Continuation of Ser. No. 354,908, May 19, 1989, abandoned, which is a continuation-in-part of Ser. No. 177,102, Apr. 4, 1988, abandoned.

[51] Int. Cl.$^5$ .............................................. C08K 5/06
[52] U.S. Cl. ..................................... 524/371; 524/180; 524/411; 524/412; 524/467
[58] Field of Search ............... 524/371, 467, 180, 411, 524/412

[56] References Cited

U.S. PATENT DOCUMENTS

| | | | |
|---|---|---|---|
| 3,432,461 | 3/1969 | Hill et al. | 260/45.75 |
| 3,730,929 | 5/1973 | Breza | 260/23 |
| 3,760,003 | 9/1973 | Asadorian et al. | 260/613 |
| 3,849,371 | 11/1974 | Wolford et al. | 260/45.75 |
| 4,219,605 | 8/1980 | Rohringer | 428/361 |
| 4,530,880 | 7/1985 | Taniuchi et al. | 428/402 |
| 4,532,287 | 7/1985 | Bill et al. | 524/343 |
| 4,965,021 | 10/1990 | Georlette et al. | 524/371 |

*Primary Examiner*—Veronica P. Hoke
*Attorney, Agent, or Firm*—David E. LaRose

[57] ABSTRACT

A flame retardant polypropylene based formulation which contains polypropylene and a flame retardant amount of decabromodiphenyl oxide and a polybrominated cycloalkane having an 8 to 12 carbon atom ring and at least 4 ring-attached bromine atoms.

20 Claims, No Drawings

FLAME RETARDANT POLYPROPYLENE BASED FORMULATIONS

This application is a continuation of application Ser. No. 354,908, filed May 19, 1989, which in turn is a continuation-in-part of Ser. No. 177,102, Apr. 4, 1988, all now abandoned.

BACKGROUND OF THE INVENTION

This invention relates to novel flame retardant polypropylene based formulations. For the purposes of this invention "polypropylene" shall mean the isotactic homopolymer formed from propylene or the block copolymer of such isotactic homopolymer and polyethylene. The block copolymer will generally contain up to 94% homopolypropylene segments. Such homopolymers and block copolymers are well-known to those skilled in the art.

Polypropylene based formulations have proven to be commercially important for use in the production of film, injection and blow molded articles, extruded pipe, wire insulation and fibers. For many of these uses, it is important that the resultant film, articles, pipe, etc. have a flame retardant quality.

Flame retardancy can be obtained by including a flame retardant compound and an inert filler in the formulation. The flame retardant compound is generally a brominated hydrocarbon which can be used alone or with a synergist, such as $Sb_2O_3$. The inert filler can be talc, mica, silica, clay, chalk, etc. so long as the filler is inert to the formulation and not a ready fuel source. While such formulations may be useful, they are not ideal, since, to obtain a UL 94 rating of V-0, the amount of flame retardant and the amount of inert filler used in the formu-lation is generally high, e.g. about 25 wt. % flame retardant, 10 wt. % $Sb_2O_3$ and about 15 wt. % inert filler, based upon the total weight of the formulation. The high amount of flame retardant adds to the expense of the formulation while the high amount of filler adversely affects some of the physical properties of articles produced from the formulation. For example, the stiffness of the molded article is greatly increased, while its surface gloss is decreased when high amounts of inert filler are present.

There are some brominated hydrocarbon flame retardants which can provide the flame retardant quality needed without either the use of high amounts of flame retardant or inert filler in the formulation, e.g. tetrabromobisphenol-A bis(2,3-dibromopropylether). Such flame retardants, however, are generally expensive.

It is therefore an object of this invention to provide economical flame retardant polypropylene based formulations which do not require high amounts of flame retardant and/or inert filler. It is another object of this invention to provide articles molded from such formulations.

THE INVENTION

The novel flame retardant polypropylene based formulations of this invention comprise polypropylene and a flame retardant amount of decabromodiphenyl oxide and a polybrominated cycloalkane. The polybrominated cycloalkane has an 8 to 12 carbon atom ring and at least 4 ring-attached bromine atoms. The term "polypropylene based" means that the formulation contains at least 40 wt. % polypropylene, as hereinabove defined, based upon the total weight of the formulation.

It has been found, as shown in the examples, that the unique combination of decabromodiphenyl oxide and polybrominated cycloalkane provides a synergistic effect in the formulation of this invention. While the decabromodiphenyl oxide and the polybrominated cycloalkanes of this invention are well known as individual flame retardants in some thermoplastic formulations, their combined effect in polypropylene based formulations is unique and highly advantageous. The synergism between these two compounds provides excellent flame retardancy without the utilization of a filler in the formulation and with the use of only moderate amounts of these compounds.

It is preferred that the polybrominated cycloalkane be devoid of any hydrocarbon or halogenated hydrocarbon substituents on the ring. Exemplary of the preferred polybrominated cycloalkanes are tetrabromocyclooctane, hexabromocyclononane, hexabromocyclododecane and the positional isomers thereof. Most highly preferred polybrominated cycloalkanes are tetrabromocyclooctane and hexabromocyclododecane, with the positional isomers, respectively, 1,2,5,6-tetrabromocyclooctane and 1,2,5,6,9,10-hexabromocyclododecane being preferred.

The formulations of this invention can advantageously also include a synergistic amount of a compound such as $Sb_2O_3, Bi_2O_3, MoO_3, ZrO_2$ or mixtures thereof. These compounds are well recognized in the art as enhancing the flame retardant qualities of most brominated flame retardant compounds. Of these enhancing compounds, a most preferred is antimony trioxide in an amount of from about 2 wt. % to about 6 wt. %.

When the polybrominated cycloalkane is hexabromocyclododecane, it is preferred that a thermal stabilizer be utilized. Exemplary of such stabilizers are dibutyltin diisooctylmercaptoacetate and dibutyltin maleate. These stabilizers are used in conventional amounts. A particularly preferred stabilizer is dibutyltin dimercaptododecane.

The polypropylene based formulations of this invention will generally contain from about 40 to about 90 wt. % polypropylene. Preferred formulations, due to their good physical qualities, will contain from about 80 to about 88 wt. % polypropylene. The minimum amounts of decabromodiphenyl oxide and polybrominated cycloalkane used in the formulations of this invention to obtain a UL 94 V-0 rating are determined empirically as these amounts are dependent upon the particular polypropylene and the amounts, are dependent upon the particular polypropylene and the if any, of the synergistic flame retardant enhancing compound, e.g. $Sb_2O_3$, etc., present in the formulation. The presence of a flame retardant enhancing compound is preferred as a reduction in the needed amounts of decabromodiphenyl oxide and polybrominated cycloalkane is realized. However, due to the density of these flame retardant enhancing compounds, there is an economic limit on their amounts in the formulation from the standpoint of the molder. Generally, a 3 to 5 wt. % loading of these compounds is preferred, with about 4 wt. % being most preferred. In regard to the decabromodiphenyl oxide and polybrominated cycloalkane, a starting point in determining their minimum amounts in a formulation containing a flame retardant enhancing compound is to provide a sufficient amount of each to give a total of from about 8 to about 12 wt. %, with from about 3 to about 5 wt. % being decabromodiphenyl oxide and from about 5 to about 7 wt. % being polybrominated cycloalkane. When the polypropylene is a copolymer, such as Himont Inc.'s Profax ® 7523, the amount of polybrominated cycloalkane used should be from the upper end of the about 5 to about 7 wt. % range. See Example X in which 7 wt. % of Saytex ® HBCD flame retardant was present in a formulation used to produce a plaque having a UL 94 V-0 rating. Amounts of decabromodiphenyl oxide and polybrominated cycloalkane which are larger than the minimum amounts needed can be used, if desired.

The formulations of this invention may be conventionally formed by intimately mixing the ingredients thereof by any suitable means, e.g. by employing an extruder, a two-roll mill or a Banbury mixer.

After the formulation has been formed, it may be utilized in forming molded or extruded articles which have a good flame retardant quality and have good physical properties. Conventional compression molding, injection molding, extruding, etc. devices are suitable for use, the only criticality being that the molding and extruding processes not involve temperatures or other conditions which would adversely affect the formulation.

The formulation of this invention may also contain pigments, plasticizers, antioxidants or other conventional additives. In addition, the formulations of this invention may contain inert fillers. However, the amount of inert filler used should be kept low, say below 3 wt. %, as loadings of only 6 wt. % clay have been found to degrade UL-94 ratings from V-0 to V-2. In essence, the formulations of this invention are substantially filler-free.

The decabromodiphenyl oxide constituent of the formulation is well-known in the art and can be prepared by any of several processes. See for example U.S. 3,763,248 and U.S. Pat. No. 3,965,194. The polybrominated cycloalkane can generally be prepared by reacting the corresponding cycloalkene with bromine in a solvent system. For example, hexabromocyclododecane can be produced by such a process in accordance with U.S. Pat. No. 3,558,727. Also, tetrabromocyclooctane can be produced similarly by reacting 1,5-cyclooctadiene with bromine in the presence of a solvent. See British Patent Specification 1,499,976.

Examples I-VII are comparative examples and are not of this invention.

EXAMPLE I

This is a base line example in which a formulation containing 100 wt. % polypropylene (Profax ® 6423, sold by Himon Inc.) was compression molded to form a test plaque. The compression molding was performed conventionally using a molding temperature of 175° C. and a molding pressure of 250 psi. The test plaque was subjected to the Underwriters Laboratories UL 94 vertical burning test. The material burned.

EXAMPLE II

This is a base line example for providing a compression molded test plaque, which test plaque was used for comparison of physical properties in Example XI. The procedure of Example I was used in forming the test plaque. The test plaque was made, 100%, from Profax ® 7523, sold by Himont, Inc.

In the following examples, except for Example VIII, the formulations were prepared by intimately mixing the indicated constituents in a Brabender mixer.

EXAMPLE III

A test plaque was made from a formulation containing 10.4 wt. % of Ethyl Corporation's Saytex ® 102 flame retardant (decabromodiphenyl oxide), 4 wt. % antimony trioxide and 85.6 wt. % Profax ® 7523. The same procedures used in Example I were used in molding and testing the plaque, A UL 94 rating of V-2 was obtained.

EXAMPLE IV

A test plaque was molded and tested in accordance with Example I. For this example, the formulation from which the test plaque was made contained 22 wt. % Saytex ® 102, 6 wt. % antimony trioxide, 14 wt. % talc and 58 wt. % Profax ® 6423. The UL 94 rating for this plaque was V-0.

EXAMPLE V

A test plaque was molded in accordance with the procedure recited in Example I. The test plaque was used in the comparison of physical properties in Example XI. The test plaque was made from a formulation of 58 wt. % Profax ® 7523, 22 wt. % Saytex ® 102 flame retardant, 6 wt. % antimony trioxode and wt. % talc.

EXAMPLE VI

A test plaque was molded and tested in accordance with Example I. The formulation used contained 9.2 wt. % of Ethyl Corporation's Saytex ® HBCD flame retardant (hexabromocyclododecane), 4 wt. % antimony trioxide and 86.4 wt. % Profax ® 7523. A UL 94 rating of V-2 was obtained.

EXAMPLE VII

The molding and testing procedures of Example I were used to form and test plaque made from 10 wt. % tetrabromocyclooctane, 4 wt. % antimony trioxide and 86 wt. % of Profax ® 6523. A UL 94 rating of V-2 was obtained.

The following examples are illustrative of this invention.

EXAMPLE VIII

A test plaque was made from a formulation containing 5 wt. % Saytex ® 102, 5 wt. % Saytex ® HBCD, 4 wt. % antimony trioxide and 86 wt. % Profax ® 6423. No inert filler was used. The molding and testing procedures of Example I were used, respectively, to form and test the plaque. A UL 94 rating of V-0 was obtained.

EXAMPLE IX

A formulation containing 3 wt. % Saytex ® 102, 7 wt. % tetrabromocyclooctane, 4 wt. % antimony trioxide and 86 wt. % Profax ® 6523 was used in forming a test plaque. The procedures used to form and test the plaque were the same as in Example I. A UL 94 rating of V-0 was obtained.

EXAMPLE X

A test plaque was made from a formulation containing 3 wt. % Saytex ® 102, 7 wt. % Saytex ® HBCD, 4 wt. % antimony trioxide and 86 wt. % Profax ® 7523. No inert filler was used. The formulation was prepared by use of a twin screw extruder. The plaque was formed by compression molding using the procedure described in Example I. The plaque had a UL 94 rating of V-0.

As can be seen from Examples VIII, IX and X, a UL 94 rating of V-0 can be obtained for polypropylene based formulations without the necessity of using a large amount of flame retardant material and an inert filler. On a wt. % basis, the formulations of this invention use less total decabromodiphenyl oxide and polybrominated cycloalkane to obtain a V-0 rating than is the case when either of these two compounds are used singularly with a filler to obtain the same V-0 rating.

EXAMPLE XI

Test plaques formed from the formulations of the indicated examples were tested for physical characteristics. Table I gives the results.

TABLE I

| Test | Plaques From The Formulations Of | | |
|---|---|---|---|
| | Example II | Example V | Example X |
| Flexural Modulus psi, ASTM D-790 | 183,380 psi | 411,480 psi | 187,940 psi |
| Tensile, psi, ASTM D-638 | 3,555 psi | 4,298 psi | 3,424 psi |
| Elongation, ASTM D-638 | 18% | 8.8% | 18% |
| Heat Deflection, 264 psi, ASTM D-648 | 61.8 | 91.25° C. | 61.4° C. |
| Gloss, observed | glossy | dull | glossy |

As can be seen, obtainment of good flame retardance in accordance with this invention does not unduly affect the physical properties measured.

What is claimed:

1. A flame retardant polypropylene based formulation comprising:
    (a) polypropylene;
    (b) up to about 10 wt. % of a flame retardant composition comprising
        (i) about 3 wt. % to about 5 wt. % decabromodiphenyl oxide, and
        (ii) about 5 wt. % to about 7 wt. % tetrabromocyclododecane or hexabromocyclododecane; and
    (c) a flame retardant synergist.

2. The formulation of claim 1 wherein said tetrabromocyclooctane is 1,2,5,6-tetrabromocyclooctane.

3. The formulation of claim 1 wherein said hexabromocyclododecane is 1,2,5,6,9,10-hexabromocyclododecane.

4. The formulation of claim 1 wherein said flame retardant synergist is $Sb_2O_3$, $Bi_2O_3$, $MoO_3$, $ZrO_2$ or mixtures thereof.

5. The formulation of claim 4 wherein said flame retardant synergist is $Sb_2O_3$.

6. The formulation of claim 1 wherein said flame retardant synergist is $Sb_2O_3$ in an amount within the range of from about 2 wt. % to about 6 wt. %.

7. The formulation of claim 1 wherein said polypropylene is present in an amount within the range of from about 80 weight percent to about 88 weight percent of the formulation.

8. A process for preparing a polypropylene based formulation having a UL rating of V-0, said process comprising blending together:
    (a) polypropylene;
    (b) up to about 10 wt. % of a flame retardant composition comprising
        (i) about 3 wt. % to about 5 wt. % decabromodiphenyl oxide; and
        (ii) about 5 wt. % to about 7 wt. % tetrabromocyclooctane or hexabromocyclododecane; and
    (c) a flame retardant synergist.

9. The process of claim 8 wherein said tetrabromocyclooctane is 1,2,5,6-tetrabromocyclooctane.

10. The process of claim 8 wherein said hexabromocyclododecane is 1,2,5,6,9,10-hexabromocyclododecane.

11. The process of claim 8 wherein said flame retardant synergist is $Sb_2O_3$, $Bi_2O_3$, $MoO_3$, $ZrO_2$ or mixtures thereof.

12. The process of claim 11 wherein said flame retardant synergist is $Sb_2O_3$.

13. The process of claim 8 wherein said flame retardant synergist is $Sb_2O_3$ in an amount within the range of from about 2 wt. % to about 6 wt. %.

14. The formulation of claim 1 wherein said flame retardant amount is from about 8 to about 12% by weight of the formulation.

15. The formulation of claim 1 wherein, of the flame retardant amount, about 3 to about 5 wt. % is a decabromodiphenyl oxide and about 5 to about 7 wt. % is tetrabromocyclooctane or hexabromocyclododecane.

16. The process of claim 8 wherein said flame retardant amount is from about 8 to about 12% by weight of the formulation.

17. The process of claim 8 wherein, of the flame retardant amount, about 3 to about 5 wt. % is a decabromodiphenyl oxide and about 5 to about 7 wt. % is tetrabromocyclooctane or hexabromocyclododecane.

18. A flame-retarded polypropylene-based formulation consisting essentially of
    (a) about 86 wt. % polypropylene
    (b) about 10 wt. % flame retardant which includes about 3 wt. % to about 5 wt. % decabromodiphenyl oxide; and
        (ii) about 5 wt. % to about 7 wt. % tetrabromocyclodooctane or hexabromocyclododecane; and
    (c) about 4 wt. % $Sb_2O_3$.

19. A process for preparing a polypropylene-based formulation having UL-94 rating of V-0 which comprises blending together
    (a) about 86 wt. % polypropylene
    (b) about 10 wt. % flame retardant which includes
        (i) about 3 wt. % to about 5 wt. % decabromodiphenyl oxide; and
        (ii) about 5 wt. % to about 7 wt. % tetrabromocyclooctane or hexabromocyclododecane; and
    (c) about 4 wt. % $Sb_2O_3$.

20. In process for preparing a polypropylene-based formulation by blending polypropylene, a flame retardant, and a

* * * * *

UNITED STATES PATENT AND TRADEMARK OFFICE
CERTIFICATE OF CORRECTION

PATENT NO.    : 5,116,898
DATED         : MAY 26, 1992
INVENTOR(S)   : ROBERT A. SCHLEIFSTEIN

It is certified that error appears in the above-identified patent and that said Letters Patent is hereby corrected as shown below:

Col. 5, Lines 41, 42    Change "tetrabromocyclododecane"
                        to -- tetrabromocyclooctane --

Col. 6, Line 43         Change "about 3 wt.%"
                        to -- (i) about 3 wt.% --

Col. 6, Line 58         Change "In process"
                        to -- In a process --

Col. 6, Line 60         Most of the claim is omitted. <u>ADD</u>

-- flame retardant synergist, the improvement therein which comprises employing a flame retardant which consists essentially of (i)   about 3 wt.% to about 5 wt.% decabromodiphenyl oxide; and
    (ii)  about 5 wt.% to about 7 wt.% tetrabromocyclooctane or hexabromocyclododecane;

-- whereby said formulation is self-extinguishing and exhibits a UL-94 rating of V-0 --.

Signed and Sealed this

Tenth Day of August, 1993

Attest:

*Attesting Officer*

MICHAEL K. KIRK

*Acting Commissioner of Patents and Trademarks*